Aug. 11, 1959 R. B. COLLINS, JR 2,899,050

RADIATIONPROOF PACKAGE FOR CRYSTAL DIODES

Filed Feb. 27, 1957

Inventor
Ralph B. Collins, Jr.
by Roberts, Cushman & Grover,
Att'ys.

2,899,050

RADIATIONPROOF PACKAGE FOR CRYSTAL DIODES

Ralph B. Collins, Jr., Newburyport, Mass., assignor to Microwave Associates, Inc., Burlington, Mass., a corporation of Massachusetts Application February 27, 1957, Serial No. 642,728

3 Claims. (Cl. 206—65)

This invention relates to electrically shielding packaging devices and more particularly to a shielding package for protecting crystal diodes or similar apparatus that is sensitive to electromagnetic radiation, during transit and storage.

It has been found that certain semiconductor devices such as diodes deteriorate in electromagnetic fields, particularly fields of radio frequency, and should therefore be shielded during transport and storage. Heretofore this shielding has been accomplished by means of conventional metal boxes or soft metal capsules which, while they carry out the shielding function cannot do this in a manner that is suited for the peculiar nature of these devices. Among other defects, they conveniently accommodate only one crystal, they are relatively expensive, they require special wrappings to hold the device firmly within the package without permiting damage therto, and they are not conveniently reusable.

Objects of the invention are to provide a shielding package for radiation sensitive devices such as crystal diodes which is more versatile than the packages previously used, which is safer because the device to be shielded is firmly held within the package, by means of which one or two devices can be accommodated in the same package as desired, which can be repeatedly reused, and which is inherently in expensive while fully and reliably effective for the above purposes.

In a short summary of the invention, these objects are achieved by providing a protective package for electronic apparatus of the above characterized nature and having a flange at or near one end, which package comprises a tube of any desired cross section having on the outside a layer of metal and having an inner surface substantially mated to the outer surface of the diode below the flange, and a detachable metal cap over each end of the tube accommodating the flange and fitting with its rim the outside of the tube. When the apparatus such as a diode is inserted in the tube the flange abuts the end of the tube, and the metal cap can then be slipped over the flange and with its rim secured over the end of the tube providing a mechanical closure as well as a metallic shield for the diode in a compact package which holds the diode securely within the package. Preferably, the tube is at least twice as long as one diode such that a diode may be inserted in each end thereof, and two metal end caps are secured to the tube with a friction fit. In this manner either one or two diodes can be inserted in the tube as desired and securely shipped or stored while being completely shielded.

In another aspect the invention involves the combination of a protective container and one or two radiation sensitive apparatus therein, the apparatus having a flange near one end, and the container comprising a tube at least twice as long as an apparatus and with its inner surface substantially mating an outer apparatus surface with the apparatus flange abutting the end of the tube and the tube having a metallic layer, and the container further comprising a detachable metal cap fitting each end of the tube. This combination of flanged radiation sensitive apparatus with a tube and cap that are arranged for engaging the flange provides a completely shielded and protected storage and shipping unit.

A specific embodiment of this invention is shown in the accompanying drawings in which Fig. 1 is an isometric view of the package with the two end caps inserted over the ends thereof;

Figure 1:
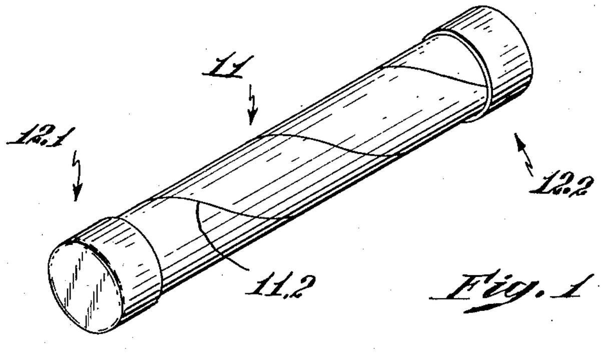

Referring to the drawings, a package made according to the invention has a container consisting of a tube 11 and two identical end caps 12.1 and 12.2. Diodes to which the invention is applied by way of example are indicated at D1 and D2 and comprise a main body 15 having at one end a metal flange 16 and at the other end a pin 17. The inner surface 21 of the tube substantially mates with the outer surface 22 of the main body of the diode such that when a diode is inserted into the end of the tube, the flange 16 abuts the end of the tube.

The caps have rims 12.12 which accommodate the flange 16 and snugly with some friction, fit the outside surface 23 of the tube.

After a diode is inserted into the tube, an end cap 12.1 or 12.2 is placed thereover and is secured to the tube with its frictional fit. To facilitate insertion of the cap over the end of the tube and the flange 16, the rims 12.12 of the caps can be outwardly flared.

Figure 2:
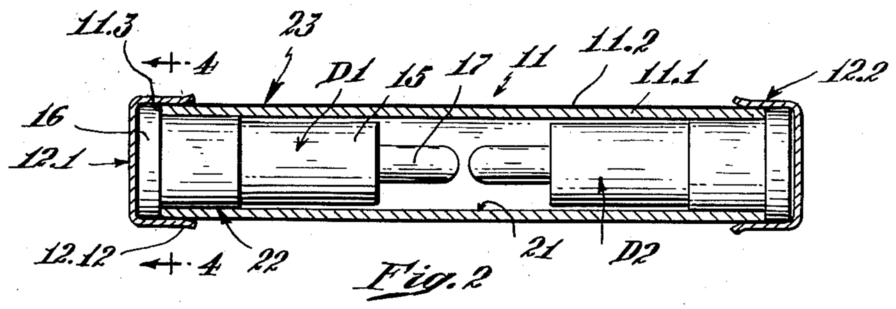
Fig. 2 is a longitudinal section of Fig. 1 showing two diodes in the package.
Figure 3:
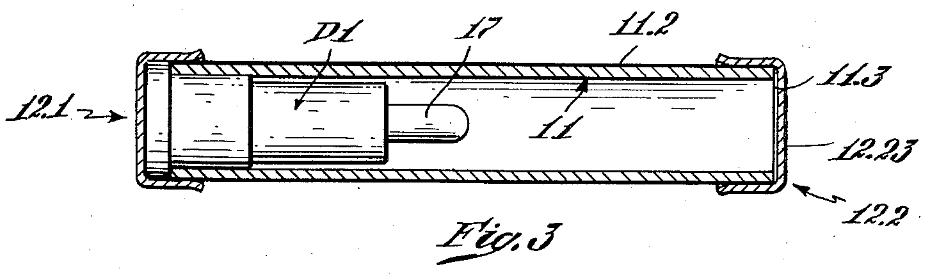
Fig. 3 is a section similar to Fig. 2 showing the tube with only one diode inserted therein.
Figure 4:
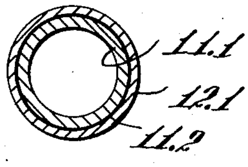
Fig. 4 is a cross section taken on the line 4—4 of Fig. 2.

As shown in Fig. 2 a diode can be inserted in each end of the tube, or the package may be used as shown in Fig. 3 to protect only a single diode. In the latter case, the cap 12.2 over that end of the tube which does not have a diode is telescoped over the tube until its end wall 12.23 abuts the edge 11.3 of the tube as shown in Fig. 3. To facilitate the accommodation of two diodes in a single package the tube 11 should be at least the combined lengths of diodes D1 and D2, plus a small gap between the pins 17.

In the illustration shown the tube is preferably made of rolled fiber indicated at 11.1 or the like which is then covered with aluminum foil 11.2. The end caps 12.1 and 12.2 can advantageously be made from pressed aluminum.

By means of the package as shown an extremely simple, reusable, compact and inexpensive shield is provided which holds the sensitive and fragile diodes securely in place within the tube and which may be used to package and shield either a single diode or two diodes as desired. Since by means of this package each diode is individually restrained from movement within the tube, the diodes are much less sensitive to damage during handling.

It will be understood that the present disclosure is for the purpose of illustration only and that the invention includes all modifications and equivalents which fall within the scope of the appended claims. It will now be evident, for example, that the tube can be constructed entirely from metal or that the metal can be coated on the inner surface of a fiber tube or that it can be sandwiched between two layers of fiber. It will also be evident that the caps over the ends of the tubes can be secured thereon by threads, clamps or other suitable fastening means. It should be further understood, that, while the tube must mate with the main body of the diode or similarly shaped device sufficiently to prevent the insertion of the flange therein, the tube need not contact the diode at all points, it being sufficient if the tube abuts the flange at at least two opposed points. Thus for a round diode, the tube cross section could be a polygon, an ellipse, or the like, although preferably it is concentrically round.

Instead of consisting of a spirally wound aluminum foil as indicated at 11.2 of Fig. 1, the shielding metal layer can be applied by spraying, dipping, or any other available technique, or a lining corresponding to the fiber tubing 11.1 can be applied to a metal tube.

I claim:

1. A device for packaging and shielding against electromagnetic radiation a pair of electronic apparatus such as two crystal diodes each having a flange near one end, comprising: a smooth tube of yielding material having a layer of metal on the outside, being open at both ends and at least twice as long as the apparatus, and having its inner surface substantially mated to the outer surface of the apparatus, and having substantial uniform thickness such that its annular end surfaces are at least as wide as said flanges and such that the flange of the one apparatus abuts one end of the tube and the flange of the other apparatus abuts the other end of the tube when both apparatus are inserted therein; and two detachable metal caps fitting each flange and the tube such that the tube ends and caps are identical and one or both apparatus can be locked by the flanges between the ends of the tube and the metal caps; whereby either a single or both apparatus can be completely shielded and securely packaged.

2. The combination of a protective package and two substantially identical electromagnetic radiation sensitive apparatus therein; said apparatus each having a flange near one end, and said package comprising a fiber tube surfaced with aluminum foil, said tube being open at each end and at least twice as long as one of said apparatus having its inner surface substantially mated to the outer surface of the apparatus, and having substantial uniform thickness such that its annular end surfaces are at least as wide as said flanges and such that the tube ends are substantially identical and that upon insertion of an apparatus at any end of the tube the flange of the apparatus abuts its end; and two detachable substantially identical metal caps frictionally fitting the aluminum foil at the ends of the tube and accommodating a respective flange; whereby the apparatus are completely and compactly shielded and are tightly held in the package by the flanges locked between the tube and the metal caps.

3. The combination of a protective container and an electromagnetic radiation sensitive apparatus therein, said apparatus having a metallic flange near one end and a cylindrical surface extending therefrom; and said protective container comprising a cylindrical tube at least twice as long as said apparatus and with its inner surface contacting said cylindrical surface of said apparatus, the flange of the apparatus abutting a respective end of the tube, the tube having a metallic layer covering its outside and having substantial uniform thickness such that its annular end surfaces are at least as wide as said flange, and a detachable metal cap fitting each end of the tube and frictionally contacting said metallic layer; whereby the apparatus is completely shielded and tightly held in the container by the flange locked between the tube and the cap.

References Cited in the file of this patent

UNITED STATES PATENTS

| | | |
|---|---|---|
| 1,664,350 | Cappiello | Mar. 27, 1928 |
| 2,302,933 | Barol | Nov. 24, 1942 |
| 2,415,589 | Hahn | Feb. 11, 1947 |
| 2,700,518 | Ryno et al. | Jan. 25, 1955 |
| 2,718,298 | Houser | Sept. 20, 1955 |